United States Patent [19]
Den Dopper et al.

[11] Patent Number: 5,405,074
[45] Date of Patent: Apr. 11, 1995

[54] REFLOW SOLDERING APPARATUS

[75] Inventors: Rolf A. Den Dopper, Roosendaal; Johannes J. H. Luijten, Heeze, both of Netherlands

[73] Assignee: Soltec B.V., Oosterhout, Netherlands

[21] Appl. No.: 94,311

[22] Filed: Jul. 20, 1993

[30] Foreign Application Priority Data

Jul. 29, 1992 [NL] Netherlands .......................... 9201370
Dec. 29, 1992 [NL] Netherlands .......................... 9202279

[51] Int. Cl.⁶ ............................................. B23K 1/012
[52] U.S. Cl. ...................................... 228/42; 219/388; 432/128; 432/152
[58] Field of Search ................. 228/234.1 A, 42, 43; 219/388; 432/128, 152, 212

[56] References Cited

U.S. PATENT DOCUMENTS

| 4,909,430 | 3/1990 | Yokota | 228/234.1 |
| 5,069,380 | 12/1991 | Deambrosio | 228/43 X |
| 5,154,338 | 10/1992 | Okuno et al. | 228/42 |
| 5,172,849 | 12/1992 | Barten et al. | 432/128 X |

FOREIGN PATENT DOCUMENTS 9119587 12/1991 WIPO .

OTHER PUBLICATIONS

Patent Abstracts of Japan, vol. 16, No. 232 (M-1256), May 28, 1992 & JP,A,40 46 667 (Matsushita Electric Ind. Co. Ltd.) Feb. 17, 1992.
Patent Abstracts of Japan, vol. 16, No. 232 (M-1256) May 28, 1 1992 & JP,A,40 46 666 (Eitetsuku Tekutoron KK) Feb. 17, 1992.

Primary Examiner—Kenneth J. Ramsey
Attorney, Agent, or Firm—Banner, Birch, McKie & Beckett

[57] ABSTRACT

The invention relates to a soldering apparatus comprising: a soldering chamber; transporting means for transporting the objects to be soldered through the soldering chamber; and heating means for heating the objects to be soldered in the soldering chamber, wherein the heating means are formed by means for feeding heated gas to the chamber. A simple device is thus obtained which heats uniformly. Such an apparatus can be embodied in both closed and open form. According to one of the preferred embodiments the means for feeding heated gas are formed by at least one heating unit, wherein the heating units are each formed by a fan and at least one heating device, for instance an electrical heating filament, connected forwardly thereof. Cooling units can also be used.

20 Claims, 5 Drawing Sheets

REFLOW SOLDERING APPARATUS

The present invention relates to a soldering apparatus comprising: a soldering chamber; transporting means for transporting the objects to be soldered through the soldering chamber; and heating means for heating the objects to be soldered in the soldering chamber.

Such a soldering apparatus is known from the Netherlands patent application no. 9002260.

In this known soldering device the objects to be soldered are heated with infrared radiation generated by means of infrared lamps. This known device is costly.

With the use of infrared lamps large temperature differences occur in the elements for soldering as a result of the differing heat capacity, different colours and reflection coefficients. This problem occurs particularly in the soldering of printed circuit boards, wherein the objects for soldering onto the printed circuit boards usually have widely varying properties. The hereby resulting temperature differences are such that, although the lowest temperature is sufficiently high to obtain a good solder joint, the highest temperature is so high that the quality of the components reaching this high temperature deteriorates.

The object of the present invention is to provide such a device which avoids the above stated problems.

This object is achieved in that the heating means are formed by means for feeding heated gas to the chamber.

The production costs for the means for feeding gas to the heating chamber are considerably lower than for the means for generating infrared radiation.

It will be apparent that the invention can be applied in both open and closed soldering machines; in both cases use is made of gas as medium for supplying heat to the objects for heating.

The present invention will be elucidated hereinafter with reference to the annexed drawings, in which FIG. 1 shows a schematic lengthwise sectional view of a first embodiment of the invention;

Figure 1:
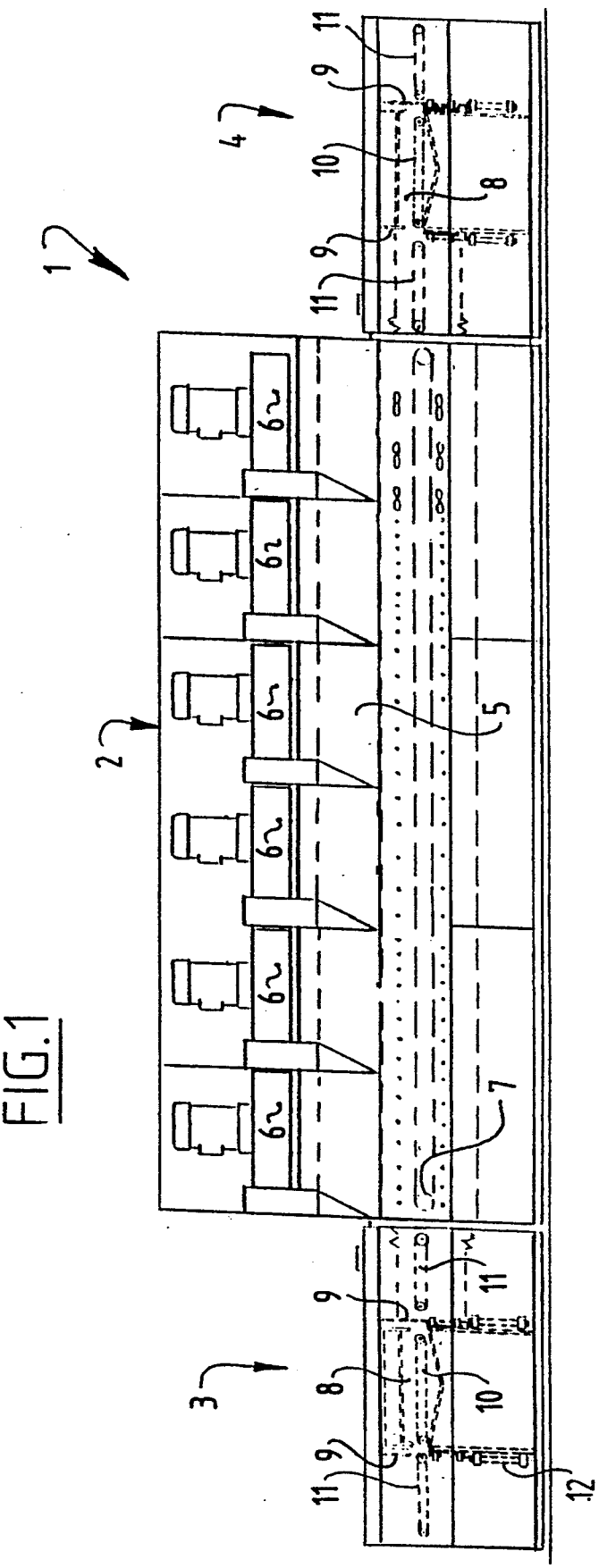

The soldering device 1 shown in FIG. 1 comprises a heating component 2 and a first lock unit 3 and a second lock unit 4. The heating component 2 comprises a heating chamber 5 and heating units 6 arranged thereabove. A conveyor belt 7 extends through the heating chamber 5. In a slightly differing embodiment the last heating chamber is replaced by a cooling chamber.

Each of the lock units 3, 4 is formed by a lock chamber 8 which is closed on either side by movable lock doors 9. In each of the lock chambers is arranged a conveyor belt 10, while on the outside of each of the lock doors is arranged a conveyor belt 11. A mechanism 12 is arranged for operating the lock doors. The lock units 3, 4 are otherwise both fixed to the heating component 2 such that the parts of the lock units connecting to the heating chamber 5 are sealed relative to the environment.

It is possible by means of all conveyor belts 11, 10, 11, 7, 11, 10, 11 to move objects to be soldered through the heating chamber 5, wherein a good sealing relative to the outside air is ensured by the lock chambers 8. Instead of conveyor belts it is of course possible to make use of other transporting means.

Figure 2:
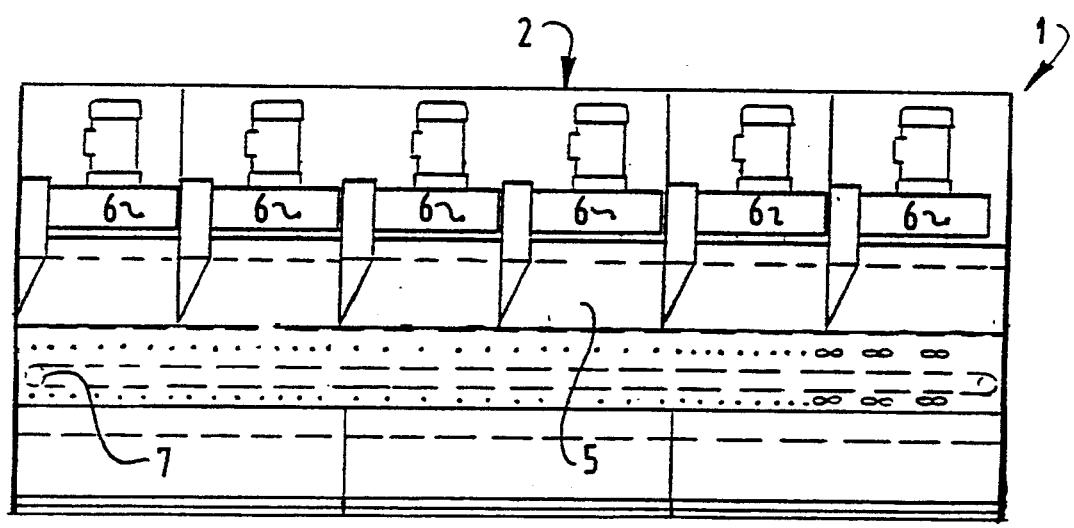
FIG. 2 shows a schematic lengthwise sectional view of a second embodiment of the invention.

The embodiment shown in FIG. 2 is wholly similar to the embodiment shown in FIG. 1 with the exception that the locks are omitted so that the second embodiment relates to a so-called open soldering machine operating with normal air or with a mix of gas substantially excluding oxygen and normal air. In this embodiment the last heating chamber 5 can also be replaced by a cooling unit.

Figure 3:
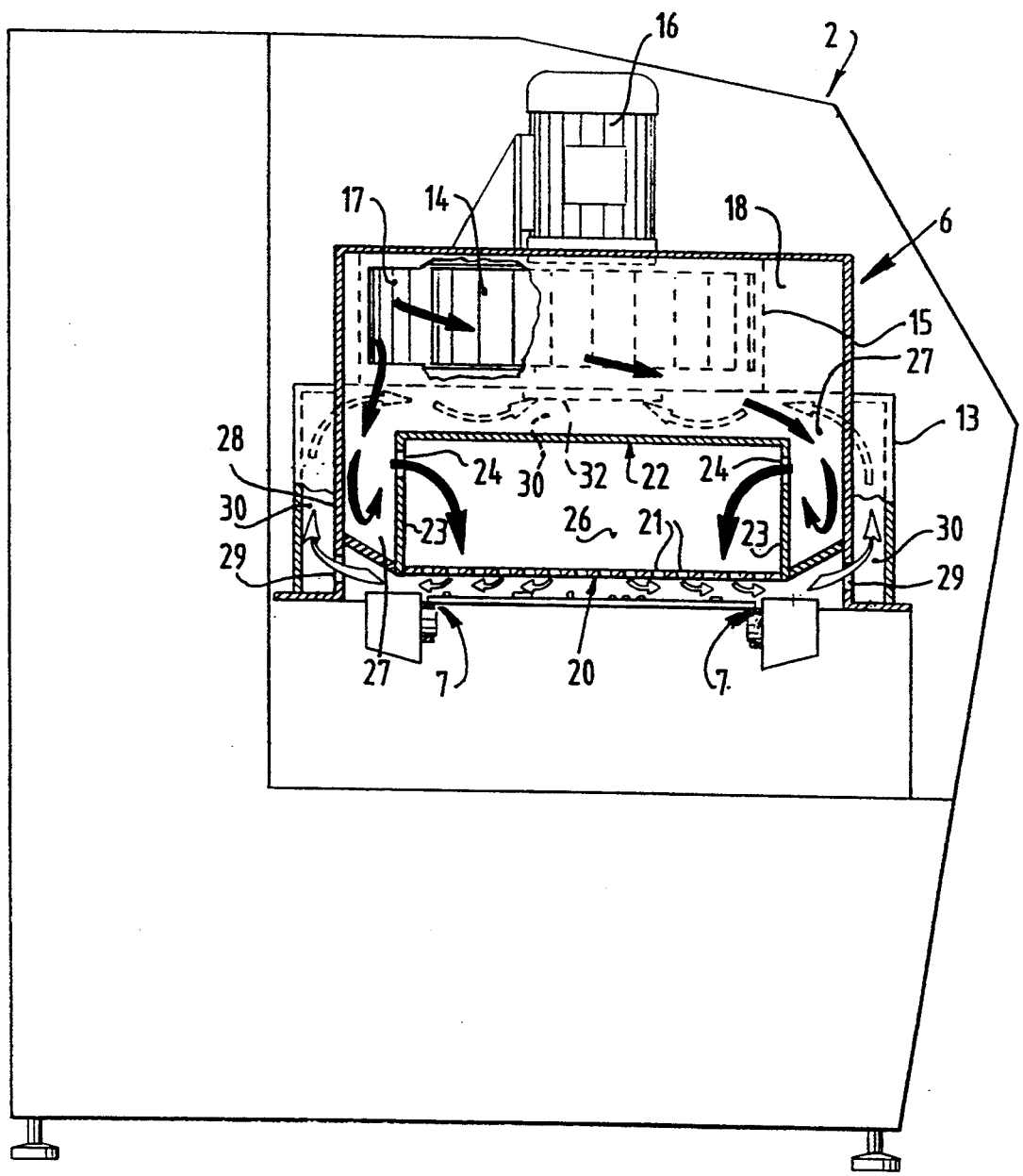
FIG. 3 is a cross sectional view of the device depicted in FIG. 1.

Arranged for feeding heated gas to the heating chamber 5 are the heating units 6 which will be discussed hereinafter with reference to FIG. 2 and 3.

Each heating unit 6 is formed by a casing 13, on the top of which is arranged a fan 14. The fan is enclosed by a fan housing 15. Arranged on top of fan housing 15 is an electric motor 16 for driving the fan. The exhaust opening 17 of the fan is connected to a distribution compartment 18 placed adjacently of the casing 13.

In the casing 13 is arranged a $\Omega$-shaped profile 19, wherein between this profile 19 and casing 13 is enclosed a channel-like space 30. Further arranged under the $\Omega$-shaped bent profile 19 is a horizontal plate 20 which is provided with apertures 21. This plate 20 is joined to the $\Omega$-shaped profile 19 by means of inclining members 22.

Further arranged on plate 20 is a U-shaped profile 22, in the side walls 23 of which are arranged apertures 24. Between the U-shaped profile 23 and plate 20 is situated a distribution chamber 26. Situated above and adjacent to the U-shaped profile 22 and under the $\Omega$-shaped profile 19 is an air distribution channel 27.

Apertures 29 are arranged in the side walls 28 of $\Omega$-shaped profile 19. These apertures lead to a U-shaped discharge channel 30 which is located between casing 13 and $\Omega$-shaped profile 19 and in the upper part of which an aperture 32 is arranged which forms the suction opening of the fan 14. In the uppermost part of this U-shaped channel 30 are arranged heating elements 31.

The operation of such a heating unit will now be described.

Gas is drawn in via the apertures 29 from the heating chamber 5 described in FIG. 1 and 2. This gas is carried through the apertures 29 to the U-shaped channel 30 and subsequently heated by the heating elements 31 present in that channel. In the present embodiment these heating elements are formed by bar-like electrical heating elements, although it is equally possible to make use of gas burners or other types of heating element; in such a case the construction of the heating units will of course have to be adapted. It is noted here that the apertures 29 are placed at the sides and that the indrawn air is displaced substantially perpendicularly of the transporting direction.

The thus heated gas substantially excluding oxygen is then drawn through the suction opening 32 into the fan, which fan carries the gas into the chamber 18 via the exhaust opening 17. The gas passes from chamber 18 into the air distribution channel 27 where the gas is distributed and where, distributed through the apertures 24, it subsequently passes into the air distribution chamber 26. The distribution apertures 24 herein ensure that the gas is distributed as well as possible in longitudinal direction, that is, in the direction of movement of conveyor belt 7.

A distribution then takes place once again in the distribution chamber, this in transverse direction, wherein the holes 21 ensure that the gas flows out as uniformly as possible through holes 21 into heating chamber 5. The outflow of the heating gas therefore takes place perpendicularly of the direction of movement of the objects to be soldered. A from of closed circulation thus results inside each heating unit, which means that there is hardly transport between the heating units. This provides the option of likewise applying this device in an open machine, that is, without locks.

The objects for soldering transported by the transporting device 7, which will generally be formed by printed circuit boards, are herein heated so that the soldering process is carried out there.

It is noted that the above described process is performed by each of the five heating units in the present embodiment. The temperature of each of the heating elements, that is, the temperature of heating elements 31, can herein be adjusted separately so that it is possible to develop a temperature profiling in the transporting direction of the device whereby the best possible soldering action is obtained.

It is further noted that this device is particularly suitable for so-called "reflow" soldering, wherein the components for soldering onto a printed circuit board are fixed on or under the printed circuit board by means of a composition containing meltable metal, and the actual soldering process is only carried out when the meltable metal is melted during heating, a solder joint being thus formed. The other components of the composition evaporate herein or do not further damage the soldering process.

It is likewise possible to have one of the heating units 6 operate without heating elements 31, so that they perform a cooling action, for instance at the end of the soldering process. Cooling coils can be incorporated instead of heating elements to cool the gas so that the solidifying process of the solder is accelerated and the components are cooled. This cooling section can also be used to clean the possibly contaminated gas by means of condensation on the cooling coils. The temperature profiling can thus be made up of more degrees of freedom.

Not only the final chamber may for instance be formed by a cooling chamber but also for instance the penultimate chamber. Nor is the number of chambers limited to five; it is obviously possible to increase or reduce the number of chambers on the basis of the desired temperature profiling.

In use of the device according to the invention a desired temperature profiling is adjusted by selecting the fan speed and the heating temperature of the heating means. Particularly during heating of the objects for soldering the sudden temperature changes at the transition of the printed circuit board from the one unit to the next can be so great that there is the danger of components present on the printed circuit board being damaged. Reduction of the temperature jump is usually not possible however, because for the purpose of the soldering process the whole must be heated to the relevant temperature for a determined period.

Figure 5:
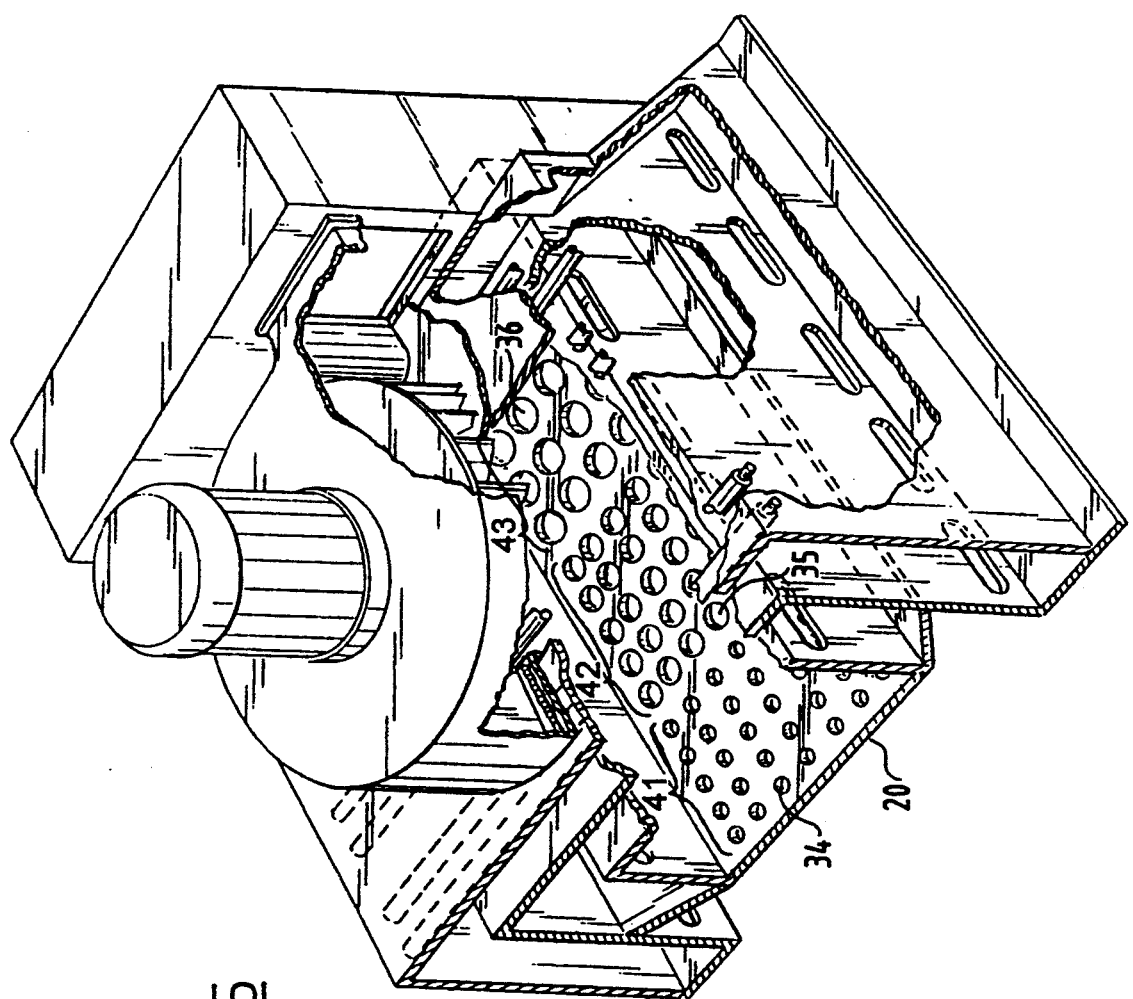
FIG. 5 shows a partly broken away perspective view of a variant of the heating device shown in FIG. 4.

The above problem is obviated by differing the flow rate of heated air to be supplied inside one heating unit. As shown in FIG. 5, the plate 20 provided with holes is herein divided into a first zone 41 in which are arranged apertures 34 ordered in a regular pattern, into a subsequent zone 42, in which apertures 35 are arranged of greater dimensions, and finally into a zone 43 in which large apertures 36 are arranged. The total passage of the apertures 34 arranged in zone 41 is smaller than that of the apertures 35 in zone 42, while the passage of the apertures 36 in zone 43 is greater than the total passage of apertures 35 in zone 42.

As a result of these steps the flow rate of heated air passing through apertures 34 will be smaller than the flow passing through apertures 35, while the flow passing through apertures 36 will be greater than the flow passing through apertures 35.

A printed circuit board entering the relevant heating unit from the side of zone 41 will therefore be initially confronted with a comparatively low flow rate of heated air, whereby a slower heat transfer takes place so that the danger of a large temperature gradient is avoided. Only when entering the second zone 42 is a greater amount of heated air supplied, but in the meantime the components have already had the time to increase their temperature. The same takes place once again at the transition to the zone 43. A large temperature change is thus divided into three smaller changes, which of course is less damaging for the components concerned since the temperature gradient has become more uniform.

Instead of the embodiment shown here, wherein holes of different size are applied, it is likewise possible to employ holes of the same size, but to use in zone 41 a smaller number of holes, to use in zone 42 the same number of holes and in zone 43 a larger number of holes. What is important here is that the total passage increases from zone 41 via zone 42 to zone 43.

Figure 4:
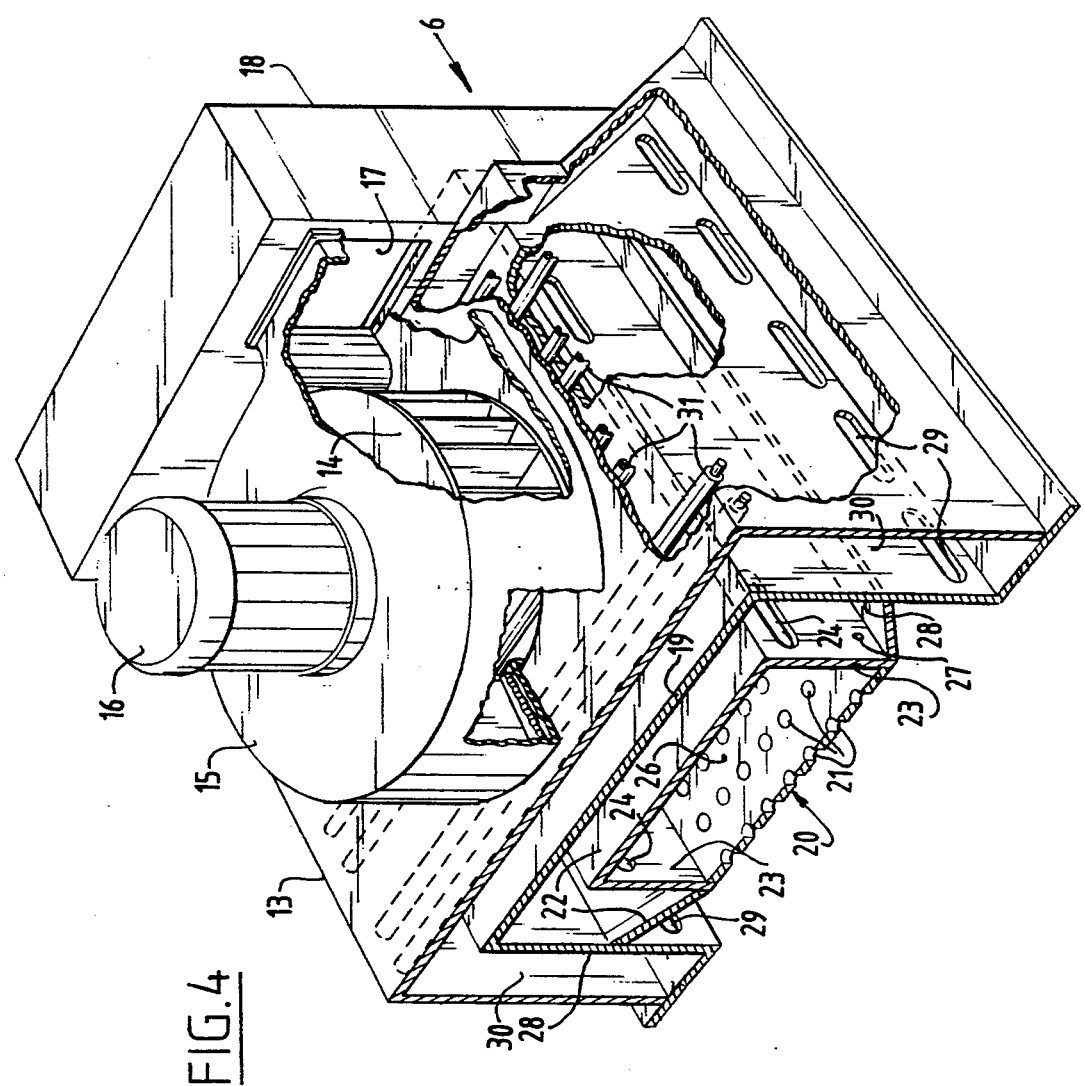
FIG. 4 is a partly broken away perspective view of a heating device which forms part of the device depicted in FIG. 1 and 2.

It is also possible to give the plate 20 a stepped form so that in zone 41 the distance between the plate and the printed circuit board for heating is greater than in zone 42, while in zone 43 the distance is smallest. This also results in a measure of heat transfer increasing in steps, whereby the temperature gradient becomes more uniform than in the original situation in the embodiment shown in FIG. 4.

We claim:

1. Soldering apparatus comprising:
   a soldering chamber;
   transporting means for transporting objects to be soldered along a feed path through the soldering chamber; and
   heating means for heating the objects to be soldered in the soldering chamber,
   characterized in that:
   the heating means include feed means for directing heated gas about said object in the chamber; and
   means for extracting gas from the soldering chamber and supplying gas to the heating means so that a substantially closed system is formed, with at least one of said extracting of gas being along a direction which is laterally perpendicular to said feed path.

2. An apparatus as claimed in claim 1, characterized in that:
   the heating means and associated feed and extracting means are divided into separate heating units.

3. An apparatus as claimed in claim 2, characterized in that:
   a temperature of the gas supplied by the heating means of each of said units is separately adjustable.

4. An apparatus as claimed in claim 2, characterized in that:
   at least one of said units is adapted for supplying heated gas within the unit with different amounts of heat.

5. An apparatus as claimed in claim 4, characterized in that:
   for feeding heated gas to the distribution chamber the latter is provided with a wall in which apertures are arranged in accordance with a regular pattern.

6. An apparatus as claimed in claim 4, characterized in that:
   the perforated plate is divided into zones which are each perforated with holes of different passage size.

7. An apparatus as claimed in claim 2, characterized in that:
   the soldering device comprises at least one cooling unit.

8. An apparatus as claimed in claim 7, characterized in that:
   the construction of the cooling unit corresponds with that of said heating units, with the difference that the heating device is replace by a cooling device.

9. An apparatus as claimed in claim 1, characterized in that:
   said heating means comprises a fan and at least one heating device situated upstream of said fan.

10. An apparatus as claimed in claim 9, characterized in that:
    the at least one heating device and the soldering chamber are separated by a substantially flat plate provided with apertures.

11. An apparatus as claimed in claim 10, characterized by:
    distribution means, connected downstream of the heating device, for distributing the heated gas to be supplied over the surface of the flat plate.

12. An apparatus as claimed in claim 11, characterized in that:
    the distribution means comprise the perforated plate arranged between a distribution chamber and the soldering chamber.

13. In a soldering apparatus having a soldering station, adjacent work processing units and means for transporting work along a feed path between said work processing units in sequence and through said soldering station, and means for applying heat to said work within at least one of said units including said soldering station in order to effect soldering of said work, the improvement of at least one of said units comprising:
    means for pumping a gas through said unit in a substantially closed cycle of recirculation;
    means, situated upstream of said pumping means and downstream of said soldering station, for heating said gas;
    directing means, situated between said soldering station and said pumping means and containing said heating means, for receiving and directing said gas from said soldering station to said heating means and then to said pumping means; and
    distributing means, situated downstream of said pumping means and between said pumping means and said soldering station, and comprising a gas redirecting and distributing chamber having spaced input holes through each of which said gas is directed generally in a first direction into said chamber, an array of output holes through each of which said gas is directed generally in a second and different direction out of said chamber, and means distributing said gas generally evenly over said array of output holes within said chamber while redirecting said gas from said first direction to said second direction and onto said work at said solder station; and
    channel means for redirecting said gas from said pumping means to said spaced input holes of said chamber and for distributing said gas over said spaced input holes in preparation for passing therethrough.

14. The improvement as in claim 13, and further comprising:
    said first direction being laterally perpendicular of said feed path.

15. The improvement as in claim 13, and further comprising:
    said second direction being vertically perpendicular to said feed path.

16. The improvement as in claim 13, and further comprising:
    means for adjusting separately a temperature in each of said units.

17. The improvement as in claim 13, and further comprising:
    said array of output holes of said chamber of at least one of said units having plural zones, with said zones having means for applying a different amount of heated gas to said work from said distribution chamber.

18. The improvement as in claim 17, and said applying means comprising:
    said output holes in each of said zones differing in diameter from said output holes in at least one other of said zones.

19. The improvement as in claim 17, and said applying means comprising:
    said output holes in each of said zones differing in number from said output holes in at least one other of said zones.

20. The improvement as in claim 17, and said applying means comprising:
    said output holes in each of said zones being spaced a different distance from said feed path than said output holes in at least one other of said zones.

* * * * *

UNITED STATES PATENT AND TRADEMARK OFFICE
CERTIFICATE OF CORRECTION

PATENT NO. : 5,405,074
DATED : April 11, 1995
INVENTOR(S) : Rolf A. Den Dopper et al.

It is certified that error appears in the above-indentified patent and that said Letters Patent is hereby corrected as shown below:

Column 4
In claim 1, line 14, delete "at least one of".

Signed and Sealed this

Fifteenth Day of August, 1995

Attest:

BRUCE LEHMAN

Attesting Officer     Commissioner of Patents and Trademarks